United States Patent [19]
Sexton, Sr.

[11] Patent Number: 5,251,656
[45] Date of Patent: Oct. 12, 1993

[54] MULTIPLE CHEMICAL FEEDER FOR SWIMMING POOLS

[76] Inventor: Wilson B. Sexton, Sr., 5330 Pebblebrook Dr., Dallas, Tex. 75229

[21] Appl. No.: 19,793

[22] Filed: Feb. 19, 1993

[51] Int. Cl.$^5$ .............................................. B01D 11/02
[52] U.S. Cl. ........................................ 137/1; 137/268; 137/564.5; 422/264; 422/266; 422/291
[58] Field of Search .................... 137/1, 268, 564.5; 422/261, 264, 266, 276, 277, 291

[56] References Cited
U.S. PATENT DOCUMENTS

| | | | |
|---|---|---|---|
| 3,229,709 | 1/1966 | Gerken | 137/268 |
| 3,368,683 | 2/1968 | Rak | 137/564.5 X |
| 3,474,817 | 10/1969 | Bates et al. | 137/268 |
| 3,595,442 | 7/1971 | Shapiro | 137/268 X |
| 3,912,627 | 10/1975 | Tepas, Jr. | 137/268 X |
| 3,915,191 | 10/1975 | Eisenthal et al. | 137/268 |
| 3,929,151 | 12/1975 | Rubin | 137/268 |
| 3,974,847 | 8/1976 | Hodges | 137/564.5 X |
| 4,027,822 | 6/1977 | Usher | 239/305 |
| 4,067,808 | 1/1978 | Phillips | 137/564.5 X |
| 4,208,376 | 6/1980 | Sangster et al. | 422/261 |
| 4,250,910 | 2/1981 | King | 137/268 |
| 4,250,911 | 2/1981 | Kratz | 137/268 |
| 4,420,394 | 12/1983 | Lewis | 210/169 |
| 4,687,031 | 8/1987 | Goudy et al. | 141/9 |
| 4,691,732 | 9/1987 | Johnson | 137/268 |
| 4,729,880 | 3/1988 | Dirksing et al. | 422/266 X |
| 4,736,769 | 4/1988 | Belanger | 137/564.5 |
| 4,759,907 | 7/1988 | Kawolics et al. | 422/7 |
| 4,790,981 | 12/1988 | Mayer et al. | 422/266 X |
| 4,867,196 | 9/1989 | Zetena et al. | 137/268 |
| 4,908,190 | 3/1990 | Maguo et al. | 422/276 |
| 4,964,185 | 10/1990 | Lehn | 8/158 |
| 4,974,634 | 12/1990 | Agulia | 137/564.5 |
| 5,076,315 | 12/1991 | King | 137/268 |

*Primary Examiner*—John Rivell
*Attorney, Agent, or Firm*—Arthur J. Plantamura

[57] ABSTRACT

An automatic swimming pool chemical feeder designed to operate on the pressure side of the filter system and which combines two independent feeding compartments is provided. A first compartment contains, for dispensing, a solid material such as water soluble chlorine tablets which erode by water flow in contact therewith and the second compartment contains a liquid also to be dispensed. Material from both compartments is dispensed as a liquid. The solid material is liquified by introducing a dissolving liquid such as water into the first compartment to dissolve at least the lower part of the solid material. The apparatus is connected in the line of a flowing liquid stream such as a swimming pool recirculation system. Liquid from both compartments is dispensed as desired in predetermined quantities from the bottom of each compartment into the pressure side of a line carrying the flowing stream into which the apparatus is connected.

14 Claims, 4 Drawing Sheets

MULTIPLE CHEMICAL FEEDER FOR SWIMMING POOLS

This invention relates to a device for holding and for dispensing at least two chemicals in measured quantities into the water of a swimming pool to maintain the cleanliness and purity of the water. More particularly, the invention relates to a device having the capability of dispensing simultaneously and in measured amounts from separate reservoirs contained within the device, a combination of a solid and a liquid chemical. The invention is especially applicable to swimming pools whereby the apparatus may be used to feed automatically into the recirculating swimming pool water, a combination of chemicals; this permits the continuous maintenance of an improved quality of pool water with less worrisome attention and less chemical consumption.

BACKGROUND OF THE INVENTION

The addition of relatively hazardous chemicals to a swimming pool water is a standard operation for maintenance of the cleanliness and sanitation of the pool water. Various chemicals are used to maintain the condition of the swimming pool water. One such chemical which is widely used is chlorine, frequently in tablet form, and various other solid chemical compounds which upon dissolving provide chlorine or a chlorine containing composition. Other widely used additive chemicals for swimming pool water are algaecides and bacteriacides, which include various quaternary ammonium compounds. The use of these chemicals in swimming pools to control bacteria and the growth of algae and to maintain purity is well known. Because these chemicals, especially chlorine in the gaseous form, is toxic and hazardous to store and to handle, and because liquid chlorine is heavy and expensive to transport and store and also has a very limited storage life, and because granular chlorine such as the calcium hypochlorite variety is not completely soluble and introduces a cloudiness of high mineral content into the water other forms of chlorine supplying materials have been tried. One such material is tablet trichloro-isocyanurate which upon dissolution yields 80-90% chlorine. This material can be fed through a pool skimmer or a feeder of a kind which floats on the pool surface or by means of an automatic chlorinator that is connected, either directly or indirectly, to a pool filtration system.

The problem with known, existing devices aimed at the automatic dissolution and feeding of solid chemicals to swimming pool water is that most such devices have little, if any, control over the eroding rate of the solid chemical. The chemical, once wetted for the purpose of dissolving it, continues in contact with the dissolving liquid even when it is desired for whatever reason to stop further feed of the dissolving solid chemical. As a result, the concentration, of the solid chemical sitting in the dissolving liquid that is being fed becomes disproportionate. Also, often times, the efficacy of the solid chemical such as the chlorine supplying tablets remaining continuously in water contained in the chlorinated devices may have an adverse effect on the chemical. An important consideration in the maintenance of swimming pool water also resides in the timing and proportioning of the chemicals added. For example, when the swimming pool water quality has deteriorated to substantially, it then becomes necessary to introduce relatively disproportionately high amounts of chemicals in an effort to restore the quality and purity of the water. This results in higher cost because chemicals are wasted and in inconvenience in that the pool is unavailable for swimming. It is also recognized in the art that when a combination of chemicals in the optimum proportions is added at the proper time, lesser quantities of the chemical(s) are needed and the quality of the water is maintained uniformly and at a superior level. Studies have shown, for example, that when a timely addition is made of a small quantity of a quaternary ammonium algaecide with the chlorine additive it can result in a reduction of as much as 65 percent in the chlorine requirements. Reference, page 7 of the Buckman Laboratories, Inc., Memphis, Tenn. catalog on algae control in swimming pools, hot tubs, and spas (1/92). Also, prior art devices generally require loading of the chemical into the chlorinator by hand, thus resulting in potential injury to the hands as well as to the lungs of the user. One known device uses a canister devised to avoid such problems but the chemical to be fed is open to the atmosphere and vents gases resulting in corrosion to surrounding materials and vegetation.

It is accordingly apparent that a need exists for an improved reliable and efficient dispensing apparatus which is capable of introducing in a timely manner a combination of chemicals automatically in measured amounts and in the desired predetermined relative proportions into a liquid stream and in particular to the recirculating water stream of a swimming pool.

SUMMARY OF THE INVENTION

It is the primary object of the invention to provide a novel apparatus for automatically feeding more than one chemical, i.e., a combination of chemicals, either intermittently or simultaneously into a liquid stream.

It is a more specific object of the invention to provide an automatic feeding device, hereinafter sometimes referred to as a "dual chemical feeder", which uses two separate reservoirs or compartments which hold different chemicals such as a solid tablet chlorine and a liquid algaecide in respectively isolated compartments and which is designed so that the chemical containers which hold the chemical and are inserted into the compartments of the feeder device are sealed and do not come into contact with the user.

It is another object of the invention to provide an apparatus with a pair of canister compartments which receive disposable, replaceable units and which uses the pressure of the pool system water circulator as the feeding means to withdraw chemical from the canisters.

Another object of the invention resides in the provision of an apparatus that is hermetically sealed and admits the entry therein of only so much water as to allow only the lowermost tablets to come into contact with, and dissolve in, the admitted water, and with tablets, above the admitted water level remaining dry.

It is another object of the invention to provide an automatic chemical feed device whereby the feed action is adjustable and is created by venturi principle and such that when the system is turned off, and no water flows, the canister is drained of all water and the solid chemical contents of the canister remain dry until the system is reactivated, i.e., further erosion of the chemical remaining in the system is interrupted.

It is another object of the invention to provide a valve control means for the chemical feed device for the amount of water entering the device. The greater the opening, the higher the water level and the more tablets exposed to water, producing a higher concentration of chemical into the pool water.

It is still another object of the invention to provide a chemical feeder which has a capability of automatically feeding a combination of chemicals at the same time in predetermined relative proportions and wherein chemicals are introduced from replaceable canisters or compartments without contact of the chemical with the person servicing the pool.

It is still another object of the invention to provide a device for the simultaneous feeding of a combination of chemicals which affords manual adjustment of the feeder and has the advantage of allowing the pool operator to compensate for pool size, water temperature, water conditions, and bather load usage.

It is still another object of the invention to provide a device which includes separate compartments that permit the dispensing therefrom a liquid and a solid chemical in controlled relative proportioned feed and which permits the enhancement of the performance of the respective chemicals in the control of pH and of the purity of swimming pool water and thereby reducing the quantity of chemicals needed for continuous maintenance of water quality.

Additional objects, advantages and capabilities afforded by the invention will become apparent from the accompanying drawing and description which follow.

BRIEF DESCRIPTION OF THE DRAWING

FIGS. 4A, 4B and 4C illustrates by a combined schematic representation of a feed control arrangement wherein FIG. 4A is a top view of the lower plate of the venturi by-pass flow adjustment arrangement of the feeder device of the invention; FIG. 4B is a detailed top view of the upper plate of the venturi by-pass flow adjustment arrangement; and FIG. 4C is a detailed schematic view of the venturi by-pass arrangement illustrating the plates of FIG. 4A and FIG. 4B in relationship.

DETAILED DESCRIPTION OF THE INVENTION

Figure 1:
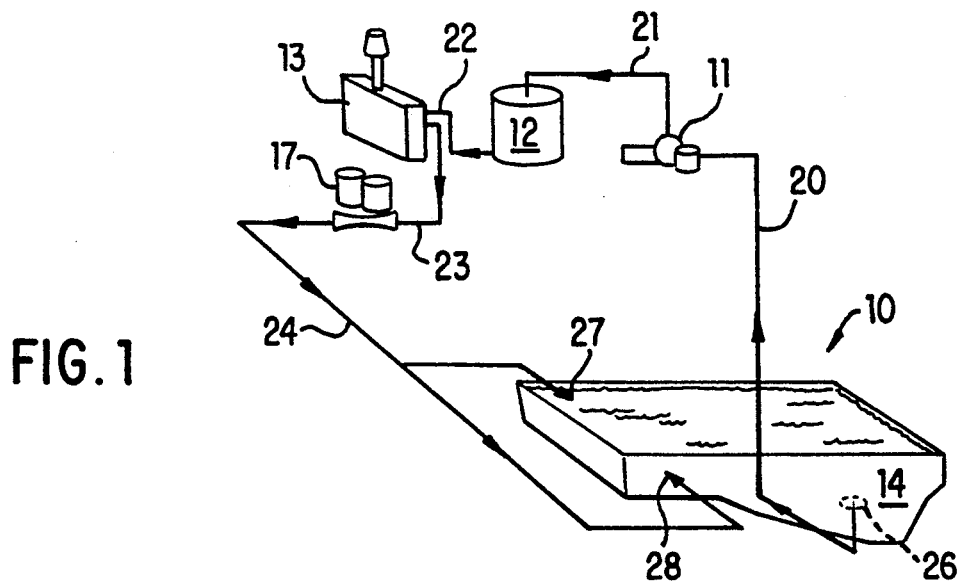
FIG. 1 illustrates a typical swimming pool water circulating system incorporating the a chemical feeder of the invention in the water circulating line.

The chemical feeder of the invention provides means for dispensing a combination of at least two chemicals from separate compartments. These compartments preferably receive replaceable disposable canisters, at least one of said compartments contains for dispensing a solid chemical, e.g., chlorine usually in tablet form. The solid chemical compartment is devised so that the solid chemical does not come in contact with the user of the chemical. The device of the invention is designed for operation, i.e., dispenses the chemical by use of pressure inherent in the water circulating system of the swimming pool. The canister which holds the solid chemical supply is hermetically sealed so that water can only enter and rise to a specific height, thus allowing only the solid chemical in the lower part of the canister to come into contact with the water flow. The solid chemical above the level remain dry. The water flow into and out of the canister is created by a venturi action. When the system is turned off, no water flows. As a consequence, the canister drains and all water contained therein is withdrawn and the chemical reverts to the dry state until the system is reactivated and water again flows into contact with the solid chemical. Accordingly, when the system is not operating, the drained compartment holds the chemical in an essentially dried more stable condition for an indefinite (storage) period.

The water level can be raised and lowered inside the canister by allowing more or less water to enter the chlorine side of the feeder through a valve arrangement operated manually by the pool operator. The greater the valve opening, the higher the water level and the more tablets exposed and dissolved in the water admitted. As a consequence of the higher level of dissolution, the greater the amount of chlorine introduced to the pool system. The manual adjustment to the feeder allows the pool operator to compensate for pool size, water temperature, water conditions, bather load, etc.

A second chamber of the chemical dispensing device of the invention contains a liquid material which when used in conjunction with the chlorine feed to either enhance the chlorine's performance or balance the pH of the water thereby improving the overall quality of the water. The liquid dispensing compartment may use in the alternative a polymeric algaecide or bacteriacide for enhancing the chlorine action or an alkalinity increaser to balance the pH of the water or a clarifier to improve overall water quality. Additionally, the liquid may comprise a liquid preparation of two or more of such chemicals.

Each of the above materials may be fed from separate compartments into the pool water circulating system in predetermined amounts one at a time or simultaneously in combination in a desired ratio, from the automatic chlorine feed. The typical pool might require a manual feed of a polymer algaecide of 4 oz. per 10,000 gallons of capacity per week. For a 20,000 gallon pool that requires 8 oz. of material per week or a little more than 1 oz. per day. The special design of the feeder device of the invention allows for such a low flow rate by using appropriate pressure to force the aqueous material through a porous plastic filter at the desired rate and at the most propitious time.

Figure 4A:
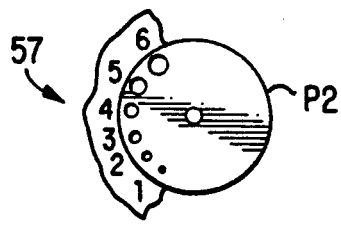
Figure 4B:
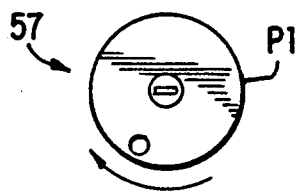

A molded plastic container of suitable configuration which has several openings at the top end and a bottle style opening at the bottom may comprise the receptacle for the liquid chemical. The liquid chemical container or canister may comprise a plastic bag, which after insertion into a relative rigid canister type container, is filled with the desired liquid material and the porous filter is used to close the bottle style opening. The viscosity of the liquid prevents flow through the porous filter by gravity. When installed into the liquid side of the feeder, the contents remain static (no flow)

until water flow enters the feeder chamber by means of a venturi action (pressure) from the pool system. When the canister is in place and the water flow occurs, water under pressure enters the liquid chamber, and then enters the molded plastic container through the several openings at the top. The resulting pressure begins forces the liquid material through the plastic porous filter in the pool's water system through a separate venturi similar to the feed of the chlorine material on the opposite side). The rate of flow is determined by water pressure differential entering the liquid chamber and the porosity of the porous filter. The size of the porous filter is pre-designed for the specific liquid to be fed and included with each canister. The pressure differential is also controlled by a suitable by-pass control which is adjustable manually by the pool operator, one form of such volume control means being illustrated by FIG. 4.

For most installations, feeding a polymeric algaecide will require on the order of 1 pound to 2 pounds pressure differential (controllable by adjusting a conventional by-pass control means). Once set for the pool, a feed control arrangement of this kind normally does not require further adjustment.

When the supply of the liquid chemical is exhausted, the container is suitably discarded and a new one is installed in its place by the pool operator. No liquid material comes into contact with the user. Because of the liquid chemical container design, there is no spillage or waste of material. Once adjusted for pool size by setting the by-pass control to the appropriate opening, a specific amount of material can be applied to the pool automatically as long as the pool operating system is running. Once adjusted for pool size, an appropriate amount of the chemicals in combination can be introduced at a timely rate into the pool automatically as long as the pool operating system is running. The apparatus of the invention is essentially aimed at automatically feeding more than one chemical from a single dispensing unit to obtain better water quality and bacteria and algae control on a continual basis.

The proper controlled relative application of chemicals, e.g., chlorine and polymer algaecide, has the effect of reducing the chlorine demand and will kill and control a wider spectrum of algae and bacterial growth before the growth becomes substantial and thereby producing a consistently better quality of water.

Describing the invention with greater specificity by reference to the drawing, the system shown in FIG. 1 illustrates a typical swimming pool and water circulating arrangement 10. As shown, water, withdrawn from the swimming main drain 26, is recirculated via lines 20, 21, 22 and 23 from the swimming pool 14 by a conventional water pump, such as, for example, centrifugal pump 11 through a filter 12 and a heater 13 and the chemical feeder 17 of the invention and returned via line 24 at 27 and 28 to the swimming pool 14.

The chemical feeder device of the invention shown schematically at 17 of FIG. 1 is positioned in the flow of the recirculating line 20-24 preferably downstream from other conventional pool servicing equipment, i.e., downstream from the pump 11, filter 12, and the heater 13. Thus located, potential damage to the conventional swimming pool equipment from the relatively concentrated chemical is avoided. The feeder device 17 is placed directly in line and contains a venturi arrangement 40 which functions by a pressure differential to allow the solutions from the respective compartments of the device 17 to be fed into the recirculating system, i.e., into line 24 of the water recirculating system illustrated in FIG. 1, in predetermined amounts.

Figure 2:
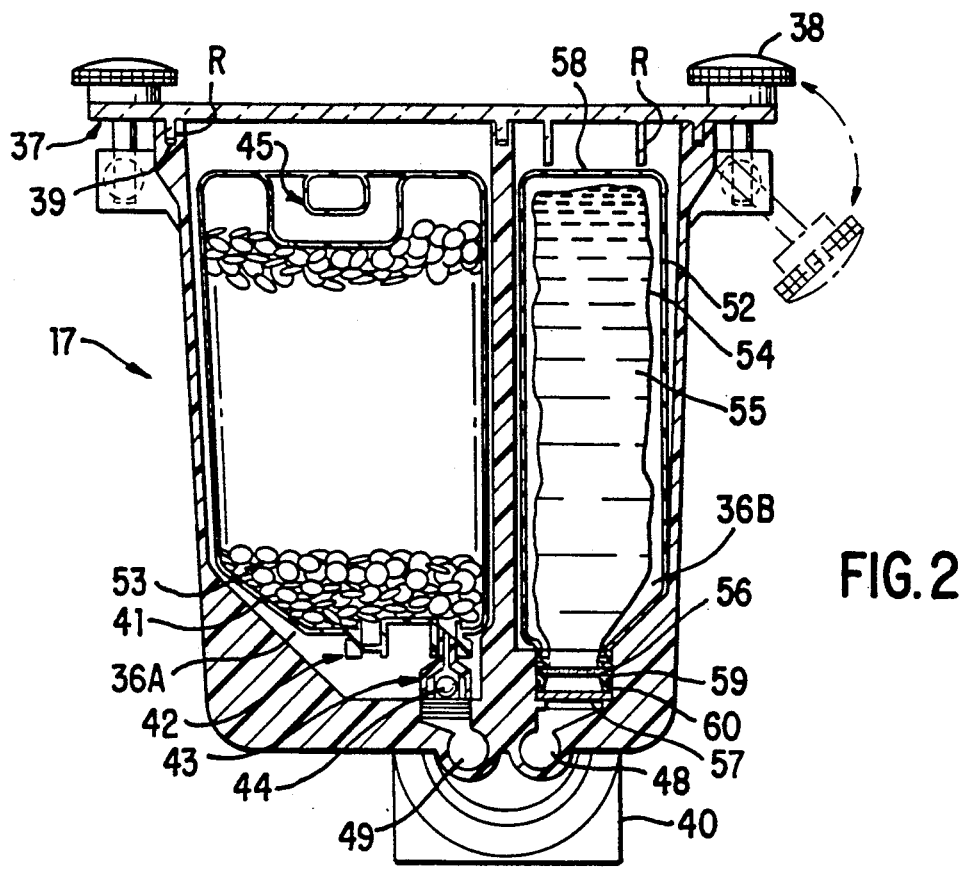
FIG. 2 is a sectional view of a preferred form of the chemical feeder of the invention.
Figure 3:
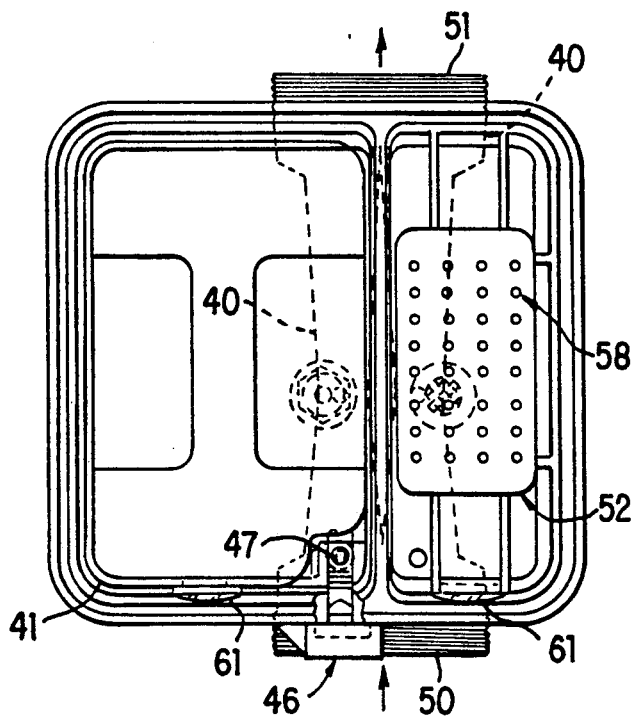
FIG. 3 is the top view of the chemical feeder shown in FIG. 2.
Figure 3A:
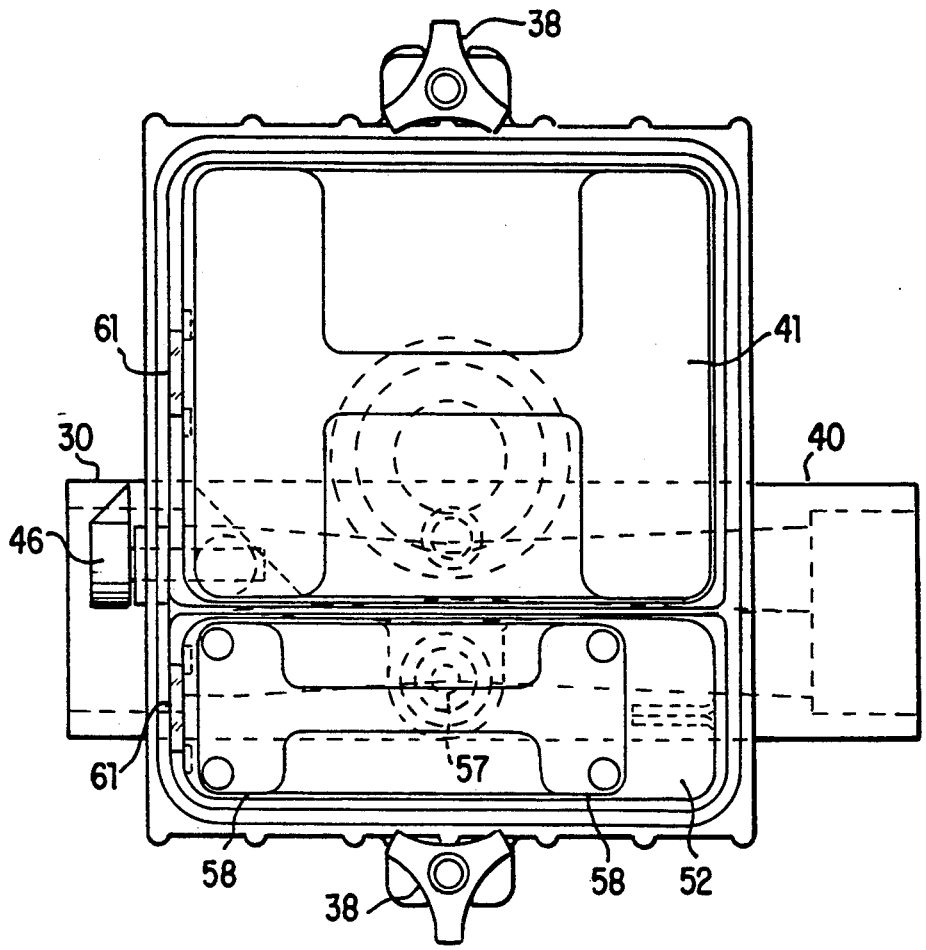
FIG. 3A is a another top view of the chemical feeder of the invention illustrating additional details.

As illustrated in greater detail in FIGS. 2 and 3, the chemical additive feeder device 17 is provided with various operational features and parts. As shown, water flows into the feeder device 17 at 50 through a dual venturi arrangement 48 and 49 and exits at the outlet 51 (see FIG. 3). It is known that water flowing through a venturi arrangement creates a pressure differential at different locations within the venturi. The device of the invention uses a dual venturi design within the venturi housing 40, thereby allowing for separate solution feeds. One side of the venturi is available for use for a solid chemical (which is pre-dissolved), such as a chlorine yielding compound in tablet or other solid form, and the other side is used for a fluid chemical solution such as a liquid algaecide. By using an arrangement with two separate venturis, the feeder device 17 is provided with a capability for dispensing different chemical solutions in amounts and ratios necessary for the successful operation of a swimming pool, thereby affording improved chemistry and providing lower material usage and ease of operation for the user over conventional methods.

Upon installation of the feeder device 17 into a flowing water line, such as the recirculating line 23 of a swimming pool filtration system, the lid 37 of the feeder apparatus is removed by turning the securing knobs 38 counter-clockwise, pivoting the knobs 38 to a lateral out-of-the-way position and permitting the lifting of the lid 37. The lid 37 is preferably formed of a suitable, transparent plastic composition. The removal of lid 37 exposes two chambers or compartments, one of which 36A holds the dry chemical, e.g. chlorine tablets, and the other, 36B, holds a second material such a liquid algaecide. The housing of the chemical feeder 17 and the dual venturi arrangement 40 in the housing are preferably an integrally formed unit which may be manufactured by known means, such as by injection molding a suitable plastic.

In the use of the apparatus of the invention, the solid chemical, such as chlorine tablets held in a disposable container and to be fed into the circulating system, is introduced into the compartment 36A. The compartment 36A is formed so that the depletable chemical canister or container 41, when it is pushed downward into the compartment 36A, the container 41 is punctured at two places. For this purpose, an inlet puncture fitting 47 with puncture element 47A (see FIG. 2A) and an outlet water puncture fitting 43 at the lower part of the container are provided. Both the upper puncture element 47A and the lower puncture fitting 43 and puncture element 43A thereon are also preferably of a molded plastic design and having a density and hardness so that the canister piercing structure, i.e., pointed perforating elements 47A and 43A, effectively puncture small opening in the wall of the container 41 which is comprised of a relatively thin walled plastic such as is obtained, for example, in blow molding polyethylene.

Figure 2A:
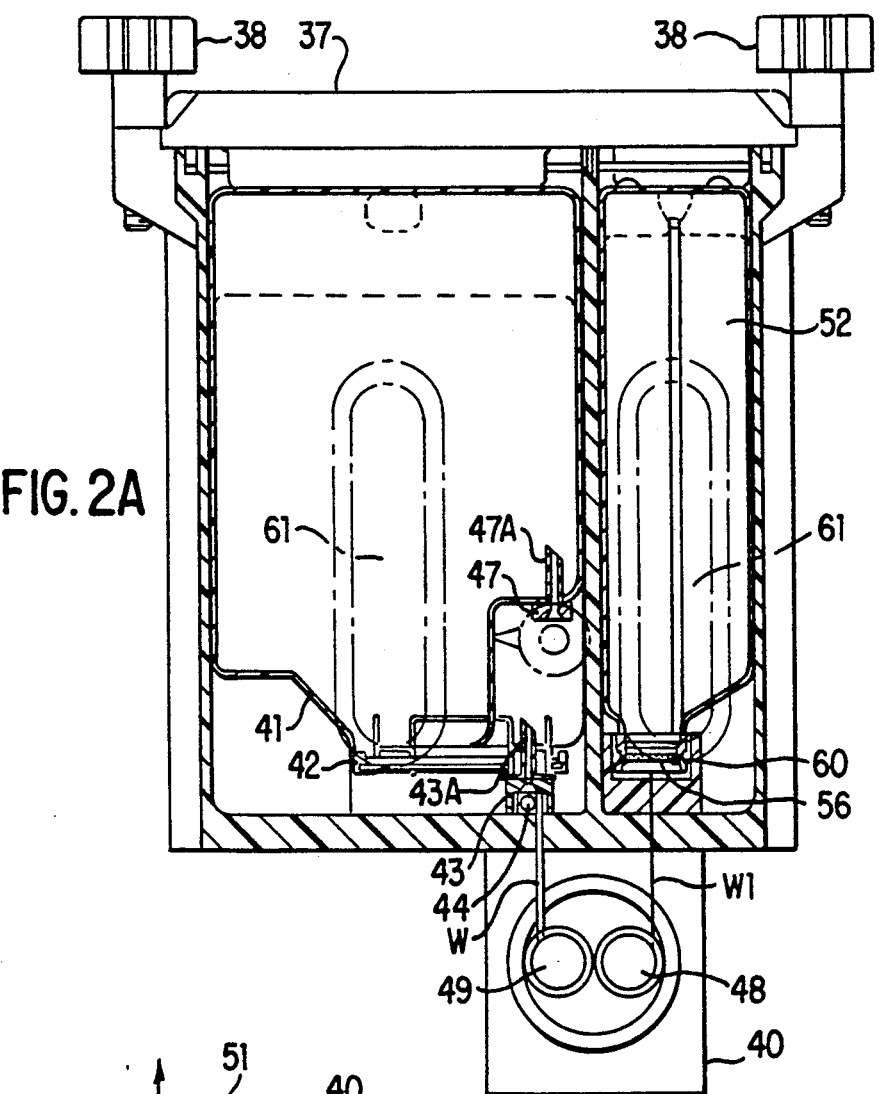
FIG. 2A is another sectional view of the chemical feeder of the invention illustrating additional details.

Upon insertion in the feeder device 17, the chemical supply container 41 is pressed down to effect the puncture by the two fittings 43 and 47 (see FIG. 2A). These fittings also insure a correct positioning of the container 41 for proper liquid flow and chemical solution dispensing. The lid 37 is preferably formed with a mating design such as with ribs R that protrude into both the chambers 36A and 36B and such that the lid 37 cannot be sealed without the containers 41 and 52 being in the fully seated and oriented position as a prerequisite to the liquid feeding operation.

The puncture fitting 47 is connected by a integrally molded waterway W to the dissolved solid material venturi at the side having a greater pressure thus allowing water from the recirculating system at 23 which is under pressure to flow up into the solid material container 41 through the puncture hole 47. The solid material container 41, typically a chlorine solution prepared by dissolving a chlorine yielding solid compound, is preferably filled at a commercial chlorine repackaging distribution facility with a chlorine yielding material such as tri-chloro isocyanuric form of chlorine. A container 41 of a conventional size may be designed, for example, to hold about 2.5 kilos or about 5.5 pounds of dry material.

Water flows out of the container 41 by way of the puncture 43 which is directly connected by a molded waterway to the chlorine side venturi 49 at a lessor pressure position.

The waterway puncture fitting 47 is located on the higher pressure location of the venturi 49 and the puncture fitting 43 is located on the lower pressure location of the venturi 49. As thus positioned, a pressure differential between the two locations creates a positive flow of water from the recirculation system (see FIG. 2A) upward through fitting 47 into container 41, out through fitting 43, back through the venturi 49 into the swimming pool recirculating system and functions to withdraw chemical from the chemical containing canister.

The amount of water flow affecting the feed of chemical is determined by the size opening of fittings 43 and 47, the venturi design and the control valve 46 which can be adjusted according to the desired volume. The greater the flow, the more tablets are covered by water and are eroded by such flow to produce the desired chemical solution which mixes with the water being recirculated from the pool through lines 20, 21, 22, 23 and 24.

The amount of water flow and chemical to be fed into the recirculating water depends upon several factors, including size of pool, water temperature, bather load and external factors, such as rain, organic matter, etc. The combination of the venturi design and the control valve allow for adjustments for most common sized residential pools and smaller commercial pools.

Because the container 41 is hermetically sealed and air cannot escape, the rising water flow in the container 41 compresses the air within and limits the height of maximum water level. The portion of the chlorine tablets 53 above the level of the water introduced into the chlorine compartment or container 41 remains dry until tablets below this level are eroded away.

The feature of keeping tablets 53 that are not being immediately used in a dry condition is important to overall effectiveness of the chlorine material and to help prolong the useful life of the chemical supply. Moreover, when the system is in the off position, i.e., pump 11 is not running, essentially all water drains from the solid chemical container 41, thus leaving the chlorine tablets 53 dry. The arrangement also prevents a heavy surge of concentrated chlorine solution from forming inside the container 41 such as concentrated solution being injected into the swimming pool at the pump re-start up time.

The container 41 is filled by conventional commercial mechanical operation at the factory with the dry chemicals, by introducing the dry chlorine tablets 53 through an opening in the molded container 41 and suitably sealed by protective lid 42 which is compression fit to the container 41. A conventional molded handle 45 may be formed on the container to facilitate easy handling of the container by the user.

The chamber of the puncture fitting 43 includes a back flow ball valve 44 to prevent back flow of water from the recirculation system 20-24 should the system have an inadvertent surge in back pressure due to closing all valves, etc.

When the solid chemical container 41, e.g. the chlorine container is empty, as observed through the sight glass 61 (see FIG. 2A), the lid 37 is removed and the container 41 is disengaged and lifted out of the chemical feeder by the handle 45 and discarded in a suitable manner, and a new container, replenishing the solid chemical supply, is installed for use. No significant chlorine or other chemical remnants from the used containers 41 or from a replenishment container is inhaled or comes in contact with the hands of the pool maintenance operator.

Referring now in particular to the liquid chemical dispenser, a container 52 such as for a liquid algaecide, is positioned in the dispenser 17 in the compartment 36B, contiguous to the solid chemical chamber 36A, is provided. Preferably, a disposable, replaceable canister bag 54 is inserted into the chamber 36B. The outer container of the canister 52 is inserted in the direction dictated by the shape of the compartment 36B and is preferably specifically shaped to accommodate and mate with the special shape of the compartment 36B.

The liquid container 52 is devised, as is the solid chemical container so that unless the canister 52 is in the proper position and fully seated in the feeder housing 36B, the lid 37 cannot be fully closed, i.e., seated, in the sealed condition.

The liquid container 52 is preferably of a design which comprises a blow molded polyethylene outer container 52 (which resembles a conventional one quart plastic motor oil container). In a preferred form, the outer compartment 52 houses an inner plastic bag 54, which is filled at the factory with the liquid of choice, for example a polyalgaecide material.

Figure 7:
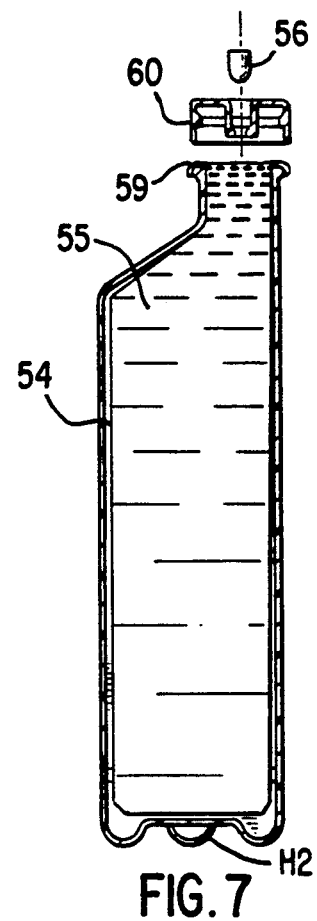
FIG. 7 is an exploded sectional view of the liquid container of FIG. 6 shown in an inverted position.

In the pre-filling of the liquid container which may be sold as a replaceable unit, the plastic bag 54 is inserted within the outer container 52 and filled with the liquid. The filling mouth 59 of the outer container 52 with the opening of the plastic bag 54 draped over the opening 59 of container 52, as shown in better detail in FIG. 7 is then sealed with a container cap 60 which in its design preferably incorporates a plastic porous filter 56.

The combination of the design of the porous filter 56 and the viscosity of the liquid used prohibits flow of liquid material through the filter 56 by simple gravity. However, when a pressure is applied to the liquid material inside the inner bag 54 a proportional amount of liquid is forced through the filter 56.

With further reference to the operation of the liquid feeder side of the dual chemical device, when the liquid filled container is properly installed in the dual chemical feeder 17 and the lid 37 is sealed, the container 52 with its porous filter 56 outlet is directly connected to a molded waterway which enters the liquid side venturi 48 at the lesser pressure position within the venturi. The greater pressure outlet of the venturi 48 is directly connected to the liquid chamber side of the dual chemical feeder device 17 which is inside the chamber 36B but outside the outer container 52.

The outer container 52 contains several openings in the upper end 58 to allow water/air to be pressurized the same approximate level as the greater pressure side of the venturi 48. This pressure is applied to the inner bag 54 which contains the liquid of choice, e.g., an algaecide.

Because the liquid container outlet through porous filter 56 is directly connected to the lower pressure side of the venturi 48 through waterway W1, the pressure differential between the two forces the liquid material 55 through the porous filter 56 into the venturi 48 and introduced into the recirculating swimming pool water.

The amount of this liquid chemical flow is controlled by the viscosity of the liquid and the porosity of the filter and the amount of pressure differential applied.

Figure 4C:
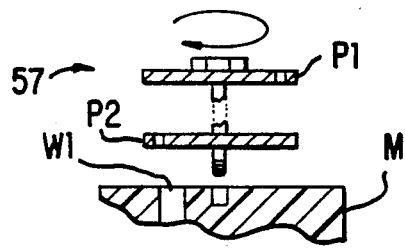

The viscosity of the liquid 55 is determined by the selection of material to be used and is matched by the pre-determined porosity of the filter 56. The remaining variable is the pressure differential which is in part controlled by the design of the venturi 48 in conjunction with a suitable flow adjustment means by opening or closing a variable venturi by-pass control 57. One form of a by pass arrangement to control feed is illustrated by reference to the schematic FIGS. 4A, 4B, and 4C which is incorporated into the dual chemical feeder device 17 as an operating mechanism which can be adjusted to various setting, e.g., minimal to increased opening. As shown a device comprising a top plate P1 (FIG. 4A) having a single flow through port or opening and is superimposed and cooperates with a lower plate P2 (FIG. 4B) which is provided with a plurality of flow through openings which vary in size. The flow control is mounted on a suitable support M at the waterway W1 to the venturi opening as illustrated in FIG. 4C. The amount of liquid feed passing through the aligned openings in plates P1 and P2 is determined by turning the top plate P1 clockwise to match the desired increasing opening in the lower plate P2 and thereby controlling the quantity of water flowing to the venturi passage and thereby lowering the applicable pressure differential with increased aligned size opening in plate P2.

The proper setting of the by-pass control 57 is essentially determined by the size of the pool and after proper adjusting, normally remains set at the position. For example, a typical swimming pool of 20,000 gallon capacity would likely be treated with as little as 1 to 2 ounces of liquid algaecide for 8-10 hour day, thus the device must be able to feed very small amounts of liquid while feeding much larger volumes of chlorine solution.

When the liquid container 52 is empty as observed through the sight glass 61, the lid 37 is removed as described earlier and the entire container properly disposed and a new filled container installed. The entire process repeats itself.

The chemical feeder of the invention, it is noted, is devised so that the user does not come into direct contact with the material used nor does the possibility normally exist to spill or waste material as is often the case with manual application by a person servicing a swimming pool.

Figure 5:
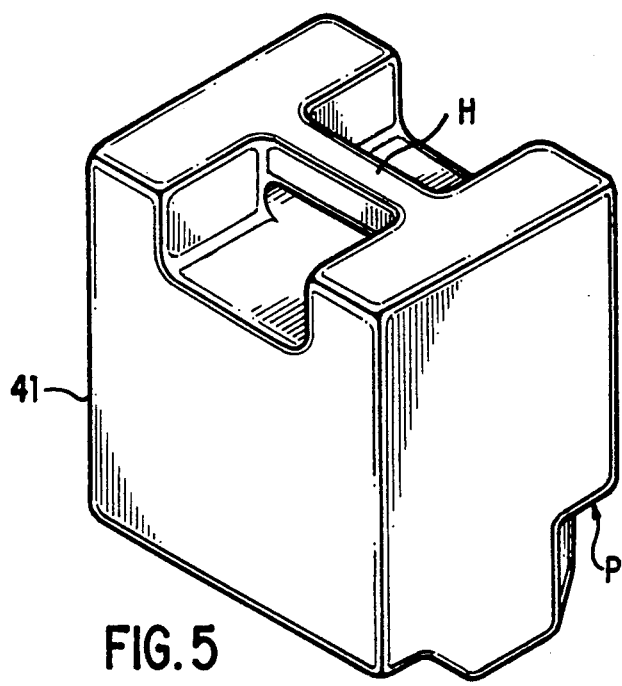
FIG. 5 is an enlarged perspective view of a typical disposable container of a kind suitable for holding solid chemical, e.g., for the packaging and the sale of chlorine generating tablets, used with the feeder device of the invention.
Figure 6:
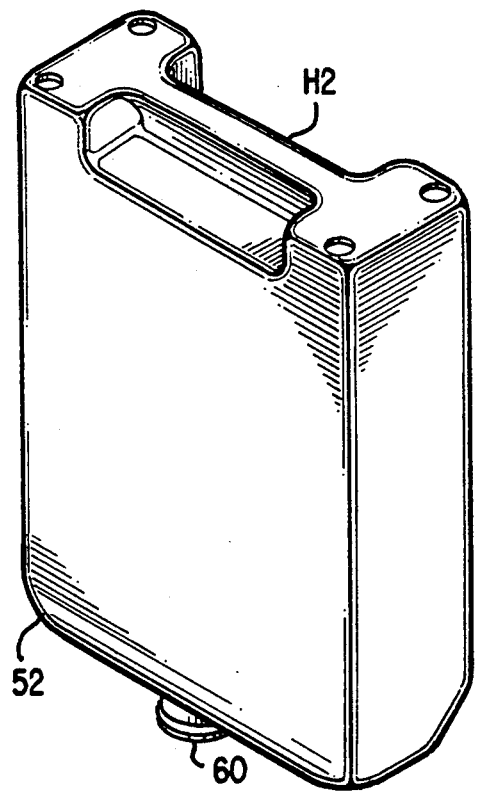
FIG. 6 is a perspective schematic drawing of a typical liquid chemical replaceable/disposable container of a kind that may be used with the feeder device of the invention.

Shown in FIG. 5 in an enlarged perspective view is a typical canister 41 for holding a solid chemical such as chlorine. A suitable handle H and pre-formed configuration at P adaptable to receive a puncturing element may be provided. Similarly, as shown in FIG. 6, is an enlarged perspective view of a typical liquid e.g., algaecide, canister 52 provided with a handle H2 and an opening covered by the cap 60.

Various modifications apparent to one skilled in the art may be made based on the present disclosure and teaching. For example, the capability of the device of the invention to feed a combination of chemicals, with suitable modification, includes also the feed of a gaseous chemical in lieu of or in combination with either or both the liquid and/or the solid chemical. Accordingly, while the preferred structure in which the principles of the present invention have been incorporated is shown and described above, it is to be understood that the invention is not to be limited to the particular details thus presented. A variety of different means may be employed in the practice of the broader aspects of the invention and the scope of the appended claims is intended to encompass such varying details, materials and arrangements of parts which will be obvious to one skilled in the art upon a reading of the present disclosure.

What is claimed is:

1. An apparatus for containing and for dispensing from distinct compartments into a flowing liquid stream in liquid form and in relative predetermined proportional amounts, at least two separate materials comprising:
   a. an exterior sealable housing;
   b. a first compartment within said housing for containing a reservoir of soluble solid material, said first compartment being provided with an opening for the introduction therein of a solvating liquid for dissolving solely a portion of said soluble solid material that is contained in the lower part of said compartment, and for dispensing said solubilized portion;
   c. a second compartment contained within said housing separate from said first compartment and positioned contiguous to, and side-by-side with, said first compartment for containing and for dispensing a liquid material;
   d. means for connecting said apparatus to a pressure side of said liquid stream;
   e. means for maintaining the solid soluble material contained in said first compartment isolated from the soluble liquid contained in said second compartment;
   f. means at the lower portion of said first and second compartments for dispensing on demand from the lower portion of each of said first and second compartments and into said liquid stream, a predetermined quantity of liquid from each of said compartments; and
   g. means for maintaining the chemicals to be dispensed separated until the chemicals are introduced into said liquid stream.

2. The apparatus of claim 1 containing a dual venturi unit positioned at the openings of said compartments and comprising a first venturi passage for drawing a separate stream from the first compartment containing the solubilized solid and a second venturi for dispensing a liquid material from the second compartment.

3. The apparatus of claim 1 including means for regulating the flow of material from said compartments into said liquid stream and an adjustable valve to regulate the dry chemical feed by allowing a controlled water flow to enter the first compartment thus controlling the rate of solvation of the dry tablets.

4. The apparatus of claim 1 including a by-pass flow control feature allowing a change in pressure differential for feeding liquid materials in minimal amounts to maintain a predetermined concentration in the liquid stream.

5. The apparatus of claim 1 including a chlorine container which is essentially air sealed from the atmosphere and against contact with the user and functions under a partial vacuum.

6. An apparatus as in claim 1 which includes an inner flexible bag in a replaceable outer canister to contain liquid and wherein the outer canister acts as a vessel for shipping and handling material and the inner bag is the receptacle for the liquid and allows pressure to be applied forcing the liquid through a small porous filter into the liquid stream through a venturi opening.

7. An apparatus as in claim 1 for feeding two incompatible chemicals in concentrated strength in a predetermined relative proportion.

8. The apparatus of claim 1 wherein the liquids dispensed from said compartments is effected separately but simultaneously and continually into said liquid liquid stream but only so long as the stream is flowing.

9. The apparatus of claim 1 provided with visual means to observe the level of material contained in said first and second compartment.

10. A feeding apparatus in accordance with claim 1 which is provided with a sealable transparent lid which is removable to resupply the chemical in the compartments.

11. A method for introducing in liquid form a combination of at least two different chemicals, at least one of which is a solid chemical, from distinct compartments into a flowing liquid stream and in relative predetermined proportional amounts comprising:
   a. providing a sealable housing for containing and dispensing the chemicals;
   b. introducing a solubilizing liquid into a first compartment within said housing, said compartment containing a reservoir of soluble solid material, said first compartment being provided with an opening for the introduction therein of a solubilizing liquid for dissolving solely a portion of said soluble solid material that is contained in the lower part of said compartment, and for dispensing said solubilized portion;
   c. introducing into a second compartment in said housing and separate from said first compartment and positioned contiguous to said first compartment a liquid material;
   d. providing means for connecting said apparatus to a pressure side of said liquid stream to dispense liquid from said first and second compartments separately into said stream;
   e. maintaining the solid soluble material contained in said first compartment isolated from the soluble liquid contained in said second compartment;
   f. dispensing on demand from the lower portion of each of said first and second compartments and into said liquid stream, a predetermined quantity of liquid from each of said compartments; and
   g. maintaining the chemicals to be dispensed separated until the chemicals are introduced into said liquid stream.

12. The method of claim 11 wherein a dual venturi unit positioned at the openings of said compartments draws a separate stream from the first compartment containing the solubilized solid and draws a liquid material from the second compartment in a predetermined proportioned.

13. The method of claim 11 wherein an adjustable valve controls the quantity of water flow to the dry chemical feed compartment to determine the rate of erosion of the dry tablets.

14. The method of claim 11 wherein the liquids dispensed from said compartments is connected to said liquid stream and dispensed separately but simultaneously and continually into the liquid stream only so long as said stream is flowing.

* * * * *